United States Patent
Lee et al.

(10) Patent No.: US 6,404,377 B1
(45) Date of Patent: Jun. 11, 2002

(54) UHF FOLIAGE PENETRATION RADAR ANTENNA

(75) Inventors: Jar J. Lee, Irvine; Stan W. Livingston, Fullerton, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/703,078

(22) Filed: Oct. 31, 2000

(51) Int. Cl.[7] .............................. G01S 7/02; H01Q 13/10
(52) U.S. Cl. ........................... 342/22; 342/21; 343/705; 343/767
(58) Field of Search ................... 342/22, 27, 21; 343/725, 729, 756, 893, 904, 700 MS, 767, 705, 706, 707, 708, 768, 769, 770, 771

(56) References Cited

U.S. PATENT DOCUMENTS

| | | | | |
|---|---|---|---|---|
| 5,206,655 A | * | 4/1993 | Caille et al. | 343/700 MS |
| 5,334,981 A | * | 8/1994 | Smith et al. | 342/27 |
| 5,428,364 A | | 6/1995 | Lee et al. | 343/767 |
| 5,900,843 A | * | 5/1999 | Lee | 343/767 |

OTHER PUBLICATIONS

IEEE Transactions on Microwave Theory and Techniques, vol. 39, No. 4, Apr. 1991, Slotline Impedance by J.J. Lee, Senior Member, IEEE; pp. 666–672.

* cited by examiner

Primary Examiner—Bernarr E. Gregory
(74) Attorney, Agent, or Firm—Leonard A. Alkov; Glenn H. Lenzen, Jr.

(57) ABSTRACT

A low cost array with wide band elements interleaved into an "egg-crate" structure. The radiating elements are flared notch radiators. Good impedance match over a wide band was achieved by feeding each element with a tapered quasi-TEM slot line, which transforms a 50-ohm input impedance to a 120-ohm radiation impedance. The radiating elements are fed by a true time delay beam-forming network to ensure that the main beam points.

16 Claims, 3 Drawing Sheets

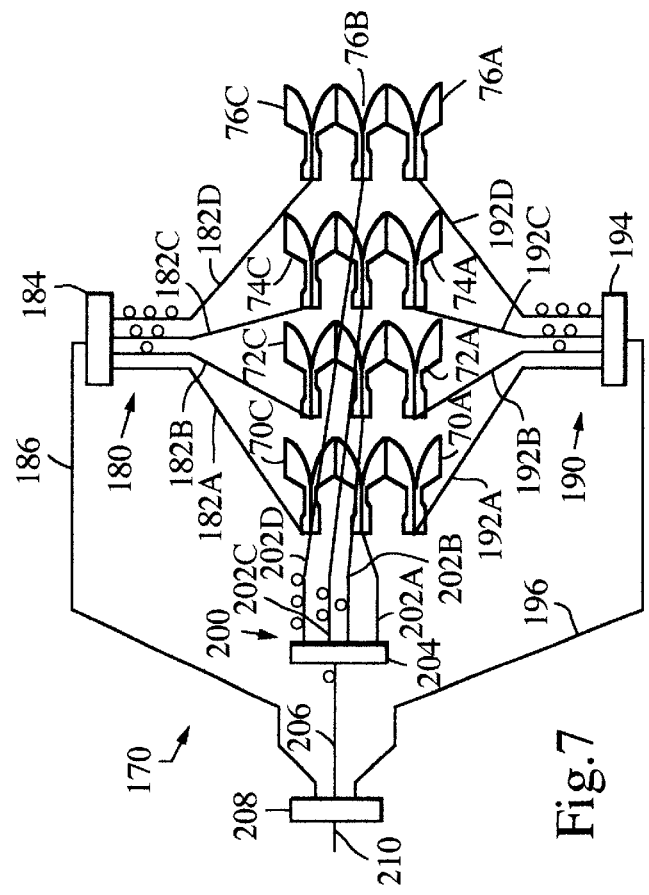
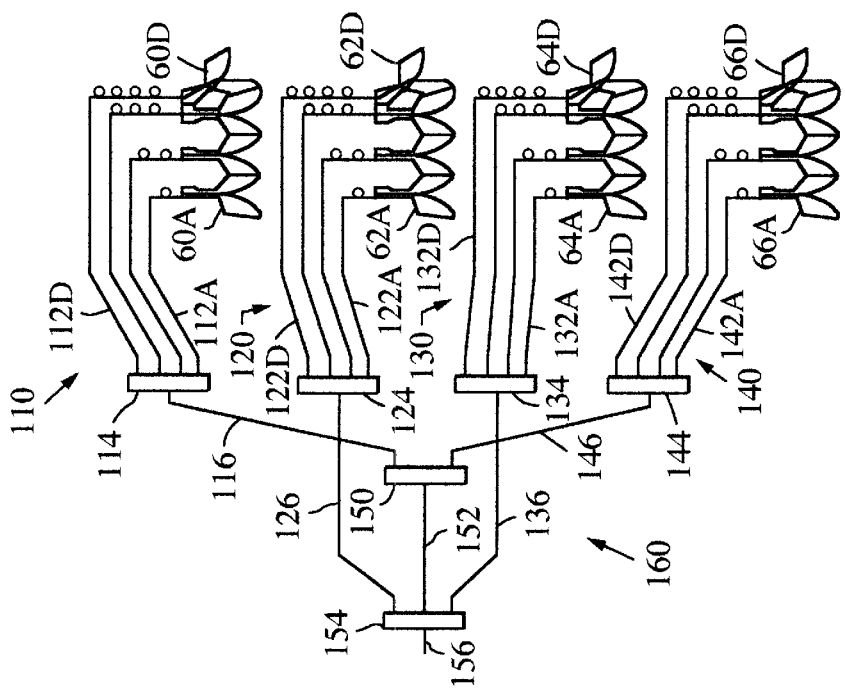
Fig. 7
Fig. 6

UHF FOLIAGE PENETRATION RADAR ANTENNA

This invention was made with Government support under Contract No. DAAB07-97-C-D614 awarded by the Department of the Army. The Government has certain rights in this invention.

TECHNICAL FIELD OF THE INVENTION

This invention relates to radar systems, and more particularly to a radar antenna suited for foliage penetration.

BACKGROUND OF THE INVENTION

The Government has a requirement for an ultra wide band foliage penetration antenna for a radar to detect targets concealed in a forest. The antenna requirements include 1) ultra wide band, 4:1 ratio UHF frequencies, 2) compact, to fit in a very shallow (50 cm) radome mounted in the belly of an aerial surveillance vehicle, 3) dual linear polarizations, V- and H-polarization, 4) well matched to have an input VSWR less than 2:1 over 90% of the band, 5) side-looking beam pointed at 30-degree depression angle, 60 degree from the nadir, and 6) high power, at relatively high altitudes.

This invention is addressed to this particular application, although the invention can be employed in other applications.

SUMMARY OF THE INVENTION

A radar antenna is described, and includes a vertical polarization subarray of vertical polarization radiating elements, including a first plurality of vertical polarization element slabs each carrying a second plurality of the vertical polarization radiating elements. The antenna also includes a horizontal polarization subarray of horizontal polarization radiating elements, including a third plurality of horizontal polarization element slabs each carrying a fourth plurality of the horizontal polarization radiating elements. The vertical polarization element slabs and the horizontal polarization element slabs are interleaved into generally transverse spaced relation to provide a reticulated compartmented structure.

BRIEF DESCRIPTION OF THE DRAWING

These and other features and advantages of the present invention will become more apparent from the following detailed description of an exemplary embodiment thereof, as illustrated in the accompanying drawings, in which:

FIG. 6 is a schematic diagram illustrating an exemplary true-time-delay beamforming network for the vertical polarization,radiating elements comprising the antenna.

FIG. 7 is a schematic diagram illustrating an exemplary true-time-delay beamforming network for the horizontal polarization radiating elements comprising the antenna.

DETAILED DESCRIPTION OF THE PREFERRED EMBODIMENTS

Figure 1A:
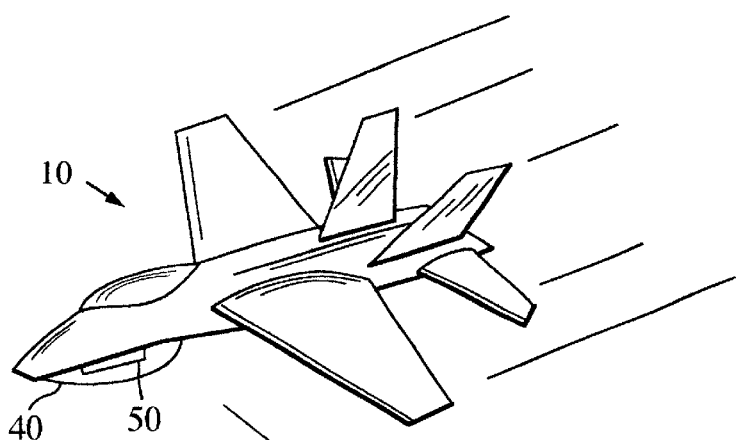
FIG. 1A is an isometric view of an aerial vehicle carrying an antenna array in accordance with an aspect of this invention.
Figure 1B:
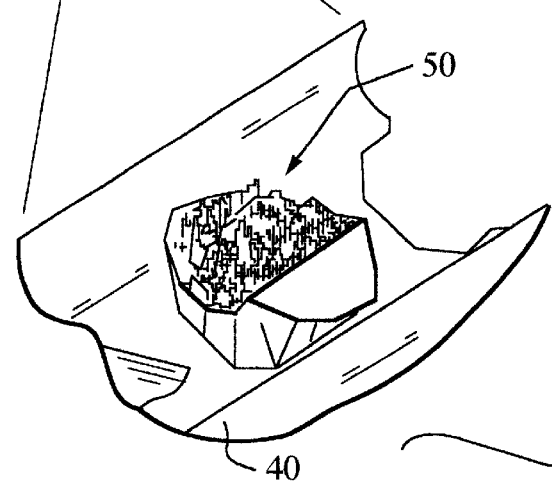
FIG. 1B is an enlarged partial broken-away view of the antenna array and radome.

A UHF foliage penetration antenna embodying aspects of this invention is useful for radar systems to detect targets concealed in trees or forest. In an exemplary embodiment schematically illustrated in FIGS. 1A–1B, the antenna 50 includes a small array mounted at the belly of an aircraft flying at relatively high altitude. The design can be scaled to operate to any appropriate frequency range, e.g. at UHF or a sub-range within this band. The antenna including the feed and a contoured ground plane 82 fits in a very shallow radome 40, e.g. 50 cm by 100 cm by 100 cm. The small volume for this exemplary application imposes a severe constraint in the electrical design and the packaging of the antenna, which produces a side-looking beam pointed at 30 degree depression angle from the horizon (60 degree from the nadir).

The 3 dB beam at mid-band for this embodiment is about 50 degrees in both elevation (EL) and azimuth (AZ) planes. Since the beam is broad enough to cover a region from 10 to 60 degree depression angles, no steering in the elevation (EL) plane was included for this exemplary application. However, azimuth (AZ) scan is accomplished by a gimbal (not shown). In this embodiment, the antenna provides dual linear polarizations over a 4:1 bandwidth with VSWR less than 2:1 over 90% of the band. With the beam peak steered to 60 degree from the broadside, it is equivalent to imposing a wide scan in the EL plane. To suppress grating lobes at the high end of the band, the element spacing is less than 25 cm, which makes it difficult to match the input impedance of the antenna at the low end of the band because the element is electrically small.

Figure 2:
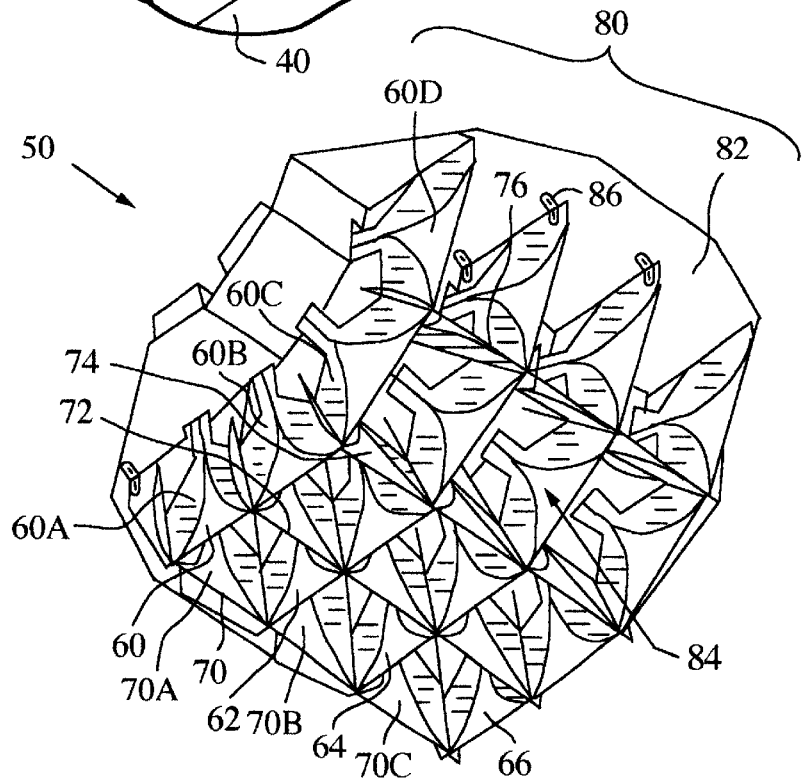
FIG. 2 is a simplified isometric view of the antenna.

FIG. 2 is a simplified isometric view of the antenna 50. The antenna array includes a vertical, four-element-by-four-element subarray of four slabs 60–66, for the vertical polarization (V-pol), and a horizontal three-element-by-four-element subarray of four slabs 70–76 for the horizontal polarization (H-pol). The V-pol subarray has four elements printed on each slab 60–66, while the H-pol subarray has three elements on each slab 70–76. Thus, for example, V-pol slab 60 has radiating elements 60A–60D printed thereon, and H-pol slab 60 has radiating elements 70A–70C printed thereon. The V-pol slabs 6–66 and H-pol slabs 6–76 are orthogonally interleaved to form a rigid "egg-crate" structure 80. Each of the radiation elements is a variation of the flared notch flared notch radiating element described in U.S. Pat. No. 5,428,364, Jar J. Lee and Stan W. Livingston, WIDE BAND DIPOLE RADIATING ELEMENT WITH A SLOT LINE FEED HAVING A KLOPFENSTEIN IMPEDANCE TAPER, the entire contents of which are incorporated herein by this reference. Good impedance match over a wide band is achieved in this exemplary embodiment by feeding each element with a tapered quasi-TEML slot line as described in U.S. Pat. No. 5,428,364, which transforms a 50-ohm input impedance to a 120-ohm radiation impedance. Slotline transmission lines are also described in "Slotline Impedance," J. J. Lee, IEEE Transactions on Microwave Theory and Techniques, Vol. 39, No. 4, pages 666 et seq., April 1991.

The slabs 6–66 and 7–76 are fabricated of a dielectric substrate, such as fiberglass FR-4, which has a layer of conductive material such as copper fabricated on both surfaces of the substrate. The conductive layer is patterned on both surfaces of the substrate by well-known processes, such as a photolithographic technique, to define the radiating elements. Thus, the radiating elements are defined by the conductive layer patterns formed on the respective slabs.

The "egg-crate" structure 82 essentially is a compartmentalized reticulated structure, wherein the slabs are positioned to define a plurality of adjacent open compartments, e.g. compartment 84. In this embodiment, the compartments have a rectangular cross-section, but the opposed slabs defining the compartments are not necessarily orthogonal. The interior compartments are bounded on the four slab sides by opposed pairs of V-pol and H-pol radiating elements. It will be seen from FIG. 2 that the H-pol and V-pol slabs are generally transverse to each other, and intersect at right angles. While the V-pol slabs 60, 62, 64, 66 in this embodiment are generally parallel to each other, the H-pol slabs 70, 72, 74, 76 are not parallel, but are tilted to provide the beam coverage desired for this application. Of course, for other applications, other orientations of the V-pol and H-pol slabs could be employed, e.g. where the V-pol slabs are parallel to each other, and the H-pol slabs are parallel to each other.

In this exemplary embodiment, the V-pol and H-pol slabs have slots (not shown) formed partially through the lateral extent, and the slabs are assembled together by sliding the slabs together along the corresponding slots, in the same manner as the dividers in an egg crate. Once assembled, there is sufficient clearance between conductor regions adjacent the corners formed by the interleaved V-pol and H-pol slabs to prevent electrical shorting of the adjacent radiating element conductor portions. Right angle brackets such as bracket 86 (FIG. 2) with fasteners are used to provide a rigid connection of the V-pol slabs, the H-pol slabs and the ground plane structure; for clarity only a small portion of the number of brackets are shown in FIG. 2.

The radiating elements for this exemplary embodiment are flared notch radiating elements. Referring to exemplary radiating element 60A', in FIG. 3, the flared notch radiating element comprises an expanded shape dipole element including a pair of generally symmetrical planar conductors 60A1', 60A2' that extend away from feed ends 60A3', 60A4' of the planar conductors and having facing edges that diverge away from each other with distance from the feed ends along a central axis to form a radiation aperture between the facing edges. The planar conductors include a pair of transition section conductor portions that extend away from the feed ends, and a pair of expanded shape dipole wing conductor portions that extend from the transition section conductor portions and which have a lateral extent that is greater than a lateral extent of the pair of transition section conductor portions.

Figure 3:
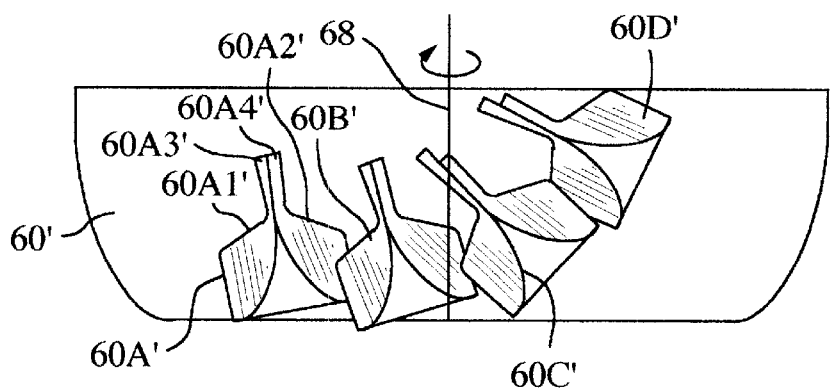
FIG. 3 shows the locations and orientations of the V-pol elements in an exemplary V-pol radiating slab for one embodiment of the antenna.
Figure 4:
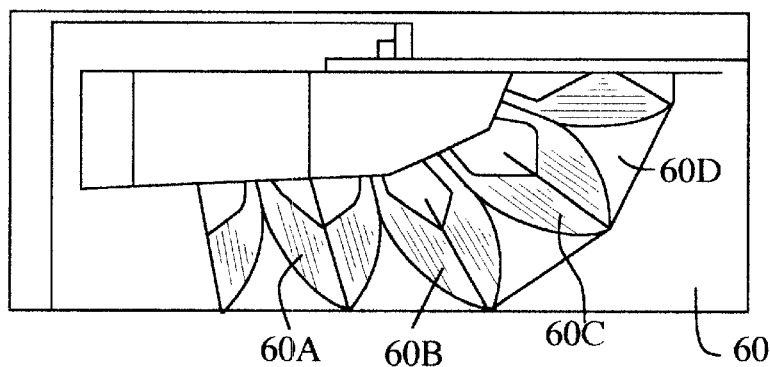
FIG. 4 shows an optimized version of the slab of FIG. 3, wherein the elements have been blended into a contiguous radiating aperture with no overlap of edges of radiating elements.

The gain at 30 degrees depression angle is improved by tilting the elements towards the horizon. FIG. 3 shows the locations and orientations of the V-pol elements 60A'–60D' in an exemplary V-pol slab 60' for one embodiment in which there is some overlapping of adjacent edges of the radiating elements. Here, element 60A' is tilted at a 10° angle relative to axis 68, element 60B' at a 16° angle, element 60C' at a 45° angle, and element 60D' at a 65° angle. FIG. 4 shows the result of use of a computer-aided design (CAD) program, such as AutoCad, which blends the elements 60A'–60D' into a contiguous radiating aperture with elements 60A–60D with no overlap on the slab.

Figure 5:
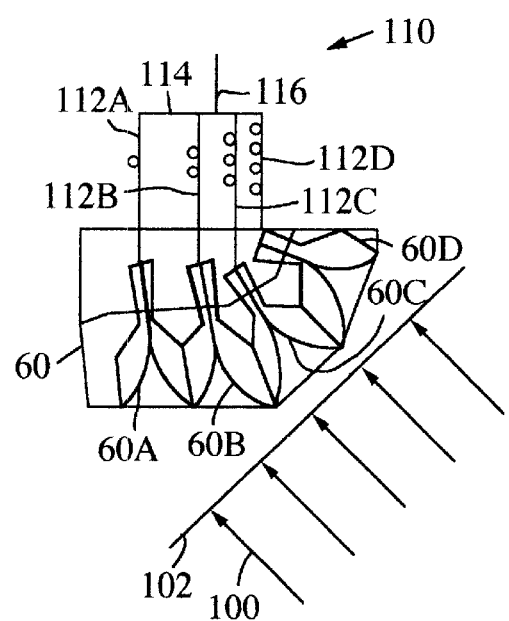
FIG. 5 is a schematic diagram of an exemplary true time delay beam-forming network for the radiating elements on a vertical slab of radiating elements comprising the antenna.

To ensure that the main beam points to a 30-degree depression angle over a wide band for this exemplary embodiment, a true time delay beam-forming network was used. This is illustrated in FIG. 5, which shows an exemplary true time delay beam-forming network 110 for the radiating elements 60A–60D on slab 60. With an incident wave 100 arriving along plane 102, the transmission lines 112A-112D respectively coupling the balun for a corresponding radiating element 60A–60D to a 4:1 combiner 114 have different effective electrical lengths, and thus act as delay lines so that energy arriving at the radiating elements from the incident wave can be combined in-phase at the combiner 120 to provide a combined receive signal on line 116. While the elements are described in a receive mode, it is to be understood that the antenna and its elements are reciprocal, and can operate on transmit as well as receive.

FIG. 6 illustrates an exemplary true-time-delay beam-forming network 160 for the V-pol radiating elements comprising the antenna 50. This network 160 includes respective slab beam-forming networks 110, 120, 130, 140 for each of the groups of radiating elements on each slab 60, 62, 64, 66. Since these slab networks 120, 130, 140 are similar to network 110, already described with respect to FIG. 5, the slab networks are not described further. The outputs 116, 146 from the outer slab networks 110, 140 are combined in a 2:1 combiner 150, and the combined output on line 152 are combined with the outputs from slab networks 120, 130 at 3:1 combiner 154 to provide the V-pol antenna output on line 156. Of course, the V-pol antenna is also used on transmit.

FIG. 7 illustrates an exemplary true-time-delay beam-forming network 170 for the H-pol radiating elements comprising the antenna 50. This network 170 includes respective true-time-delay beam-forming networks 180, 190, 200. These networks are similar in operation to network 110, already described with respect to FIG. 5. Network 180 includes respective delay lines coupled respectively to the baluns for the H-pol radiating elements 70C, 72C, 74C and 76C, 4:1 combiner 184 and output line 186. Network 190 includes respective delay lines coupled respectively to the baluns for the H-pol radiating elements 70A, 72A, 74A and 76A, 4:1 combiner 194 and output line 196. Network 200 includes respective delay lines coupled respectively to the baluns for the H-pol radiating elements 70B, 72B, 74B and 76B, 4:1 combiner 194 and output line 206. The outputs 186, 196, 206 from the networks 110, 140 are combined in a 3:1 combiner 208 to provide the H-pol antenna output on line 210. Of course, the H-pol antenna is also used on transmit.

In an exemplary embodiment, feed lengths for the lines of the true-time-delay network can be chosen using impulse measurements, which determine the differential time delay of the signal at each element. This can be achieved by transmitting a short pulse into the antenna from the far field, with the antenna broadside turned to 60 degrees from the line of sight with respect to the transmit horn. Based on these data, a coaxial cable assembly can be built to match the time delay of the incoming pulse at each element for coherent combining.

The feed network for this exemplary embodiment is mounted on the back side of the contoured ground plane 82, whose profile was shaped to direct the main beam to the desired 30-degree depression angle.

A low cost array with wide band elements interleaved into an "egg-crate" structure has been described. The radiating element is a flared notch radiating element. Good impedance match over a wide band was achieved by feeding each element with a tapered quasi-TEM slot line, which transforms a 50-ohm input impedance to a 120-ohm radiation impedance. For this embodiment, the gain at 30 degree depression angle is maximized by tilting the elements toward the horizon. To ensure that the main beam points to a 30-degree depression angle over a wide band, a true time delay beam-forming network is employed. Feed lengths are chosen using impulse measurements, which determined the differential time delay of the signal at each element.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A radar antenna comprising:
   a vertical polarization subarray of vertical polarization radiating elements, including a first plurality of vertical polarization slabs each carrying a second plurality of said vertical polarization radiating elements;
   a horizontal polarization subarray of horizontal polarization radiating elements, including a third plurality of horizontal polarization slabs each carrying a fourth plurality of said horizontal polarization radiating elements;
   the vertical polarization slabs and the horizontal polarization slabs interleaved into generally transverse spaced relation to provide a reticulated compartmented structure.

2. The antenna of claim 1 further comprising a true time delay beam-forming network coupled to the vertical polarization elements and the horizontal polarization elements.

3. The antenna of claim 1 further including for each radiating element a tapered quasi-TEM slot line coupled to the corresponding radiating element, which transforms an input impedance to a radiation impedance.

4. The antenna of claim 1 wherein the array is mounted in an aerial vehicle, and some of the radiating elements are tilted toward the horizontal.

5. The antenna of claim 4 further comprising a contoured ground plane and a radome structure.

6. The antenna of claim 1, wherein the radiating elements are printed on the respective slabs.

7. The antenna of claim 1 wherein the vertical polarization radiating elements and the horizontal polarization elements are flared notch radiating elements.

8. The antenna of claim 1, wherein the radiating elements each comprise an expanded shape dipole element including a pair of generally symmetrical planar conductors that extend away from feed ends of the planar conductors and having facing edges that diverge away from each other with distance from the feed ends along a central axis to form a radiation aperture between the facing edges, said planar conductors including (a) a pair of transition section conductors that extend away from the feed ends and (b) a pair of expanded shape dipole wing conductors that extend from the transition section conductors and which have a lateral extent that is greater than a lateral extent of the pair of transition section conductors.

9. The antenna of claim 1, wherein the radiating elements each comprise an expanded shape dipole element including a pair of generally symmetrical planar conductors that extend away from feed ends of the planar conductors and having facing edges that diverge away from each other with distance from the feed ends along a central axis to form a radiation aperture between the facing edges, said planar conductors including (a) a pair of transition section conductors that extend away from the feed ends and (b) a pair of expanded shape dipole wing conductors that extend from the transition section conductors and which have a lateral extent that is greater than a lateral extent of the pair of transition section conductors.

10. A radar antenna, comprising
    vertical polarization subarray of vertical polarization radiating elements, including a first plurality of vertical polarization slabs each carrying a second plurality of said vertical polarization radiating elements;
    a horizontal polarization subarray of horizontal polarization radiating elements, including a third plurality of horizontal polarization slabs each carrying a fourth plurality of said horizontal polarization radiating elements;
    the vertical polarization slabs and the horizontal polarization slabs interleaved into generally transverse spaced relation to provide a reticulated compartmented structure;
    a vertical polarization beam-forming network connected to the vertical polarization radiating elements; and
    a horizontal polarization beam-forming network econnected to the horizontal polarization radiating elements.

11. The antenna of claim 10, wherein the vertical polarization beam-forming network is a true-time-delay network comprising a plurality of transmission lines whose lengths are selected to provide a desired vertical polarization beam.

12. The antenna of claim 10, wherein the horizontal polarization beam-forming network is a true-time-delay network comprising a plurality of transmission lines whose lengths are selected to provide a desired horizontal polarization beam.

13. The antenna of claim 10 wherein each of said vertical polarization radiating elements and each of said horizontal polarization radiating elements is a flared notch radiating element, and further including for each radiating element a tapered quasi-TEM slot line coupled to the corresponding radiating element, which transforms an input impedance to a radiation impedance.

14. The antenna of claim 10 wherein the array is mounted in an aerial vehicle, and some of the radiating elements are tilted toward the horizontal.

15. The antenna of claim 14 further comprising a contoured ground plane and a radome structure.

16. The antenna of claim 10 wherein slabs are fabricated of a dielectric material, and the radiating elements are printed on the respective slabs.

* * * * *